United States Patent
Eshchenko et al.

(10) Patent No.: US 9,810,566 B2
(45) Date of Patent: Nov. 7, 2017

(54) ROBUST DYNAMICAL METHOD AND DEVICE FOR DETECTING THE LEVEL OF A LIQUID USING RESISTANCE TEMPERATURE DETECTORS

(71) Applicant: Bruker BioSpin AG, Faellanden (CH)

(72) Inventors: Dmitry Eshchenko, Volketswil (CH); Robert Schauwecker, Zurich (CH)

(73) Assignee: Bruker BioSpin AG, Faellanden (CH)

( * ) Notice: Subject to any disclaimer, the term of this patent is extended or adjusted under 35 U.S.C. 154(b) by 186 days.

(21) Appl. No.: 14/836,963

(22) Filed: Aug. 27, 2015

(65) Prior Publication Data

US 2016/0069728 A1    Mar. 10, 2016

(30) Foreign Application Priority Data

Sep. 10, 2014    (EP) ..................... 14184241

(51) Int. Cl.
*G01F 23/24*    (2006.01)
(52) U.S. Cl.
CPC .......... *G01F 23/247* (2013.01); *G01F 23/248* (2013.01)
(58) Field of Classification Search
CPC .............................. G01F 23/247; G01F 23/246
See application file for complete search history.

(56) References Cited

U.S. PATENT DOCUMENTS

| | | |
|---|---|---|
| 5,719,332 A | 2/1998 | Wallrafen |
| 7,392,691 B1 | 7/2008 | Yeckley |
| 2006/0042375 A1 | 3/2006 | Davis |
| 2010/0192685 A1 | 8/2010 | Sabanovic |
| 2014/0007675 A1* | 1/2014 | Mehrer ................. G01F 23/247 73/295 |

FOREIGN PATENT DOCUMENTS

GB    2 415 512    12/2005

OTHER PUBLICATIONS

Celik D. et al., "Helium II level measurement techniques". Cryogenics 2001;41:355.
Strait SF et al., "Thermal boundary resistance differences . . . ", Cryogenics 1969;9:928.

(Continued)

*Primary Examiner* — Paul West
(74) *Attorney, Agent, or Firm* — Paul Vincent

(57) ABSTRACT

A method for indicating the level of a liquefied gas in a cryogenic tank having a resistance temperature detector (1). The controller applies a heating pulse to the detector and performs a single resistance measurement after the heating pulse. The overheating of the sensor and the time interval for the measurement are found in a separate set of test experiment. As a result, for temperature sensors with negative temperature coefficient, the resistance of the sensor in gas is below some unique characteristic value, which can be used like a threshold criterion to distinguish between the liquid and the gas in a wide temperature range. For sensors with positive temperature coefficient, the resistance of the sensor in gas is larger than some unique characteristic value, which can be used like a threshold criterion to distinguish between the liquid and the gas in a wide temperature range.

11 Claims, 8 Drawing Sheets

(56) References Cited

OTHER PUBLICATIONS

Crisp RS et al., "A simple liquid helium depth . . . ", Journal of Scientific Instruments (Journal of Physics E) 1969 Series 2;2:541.
Bapna SC et al., "An inexpensive liquid level . . . ", Cryogenics 1983;23:278.
McClintock PVE, "Liquid level detector for a pumped . . . ", Cryogenics 1978;18:183.
Yoshiki H., "Simple thermo-level meter for . . . ", Cryogenics 1984;24:704.
Linensber D et al., "Thermal response times of some cryogenic . . . ", Published by American Instute of Physics, New York, 1982, vol. 5, Part 2, pp. 1367-1372.
Ardenkjaer-Larsen JH et al., "Increase in signal-to-noise ratio . . . ", Proc. Natl. Acad. Sci. USA, 2003;100(18):10158.

\* cited by examiner

ROBUST DYNAMICAL METHOD AND DEVICE FOR DETECTING THE LEVEL OF A LIQUID USING RESISTANCE TEMPERATURE DETECTORS

This application claims Paris convention priority from EP 14 184 241.9 filed Sep. 10, 2014, the entire disclosure of which is hereby incorporated by reference.

BACKGROUND OF THE INVENTION

The invention concerns a method of operation of a device for determining the position of a gas/liquid interface of a liquefied gas in a cryogenic tank, the device having at least one self-heated resistance temperature detector mentioned here down also like a temperature sensor being mounted inside the cryogenic tank by a support, the detector being connected to a current pulse generator, the device further having means to read out the temperature of the detector, the readout depending on the electric resistance of said detector, the method of operation comprising the application of at least one current from the pulse generator to the detector, the power and duration of this heating pulse being sufficient for overheating the detector at the end of this heating pulse to a temperature $T_{heated}$ above at least the temperature of its environment $T_{env}$.

A method as described above is known from Reference [9].

In general, the present invention relates to measuring the liquid level or position of a gas/liquid interface in a tank of cryogenic liquid in a wide temperature range and, in particular, the method allows to locate the surface of a pumped bath of both normal and superfluid helium.

It is often necessary to locate the surface or the liquid/vapor interface of a liquid inside a closed vessel. This also includes a task to determine the level of the liquid inside a pumped bath of He I or He II accurately inside cryogenic tank. A number of reports on cryogenic level meters have been published utilizing superconductors, resistors, capacitors, transmission lines, and other elements (as described in the review of Reference [1] and the references cited therein).

The idea to use temperature sensor as a level monitor is based on the well-established fact that the thermal contact between the sensor and the liquid is better than the thermal contact between the sensor and surrounding gas. The sensitivity of such an approach $\Delta R/R_1(I)$ where $R_1(I)$ is resistance of sensor in liquid, $R_g(I)$ is the resistance of the sensor gas and $\Delta R = R_1 - R_g$ is a function of the current I. At small currents one should see virtually no difference between sensor-in-liquid and sensor-in-gas states. As the power is increased, $|\Delta R|$ increases until the Leidenfrost point is reached (at this point the boiling of the helium around the sensor becomes so rapid that the resistor is surrounded with an envelope of vapor). As more power is dissipated, the distinction between being in liquid and in vapor disappears and $\Delta R$ approaches to zero again. For example, the study of Allen-Bradley 0.125 W carbon resistors as sensors to probe helium level at 4.2 K had revealed that the maximum sensitivity can reach up to 0.35 and the corresponding power at maximum sensitivity is a weak function of the nominal resistance and is of about 0.1 W (see Reference [2]).

At 4.2 K one can reduce the current until the relative change $\Delta R/R_1(I)$ is still well above the noise/fluctuation level (see References [3], [4]). Unfortunately this approach is not valid if the sensor is intended to be used in a wide temperature range.

In the limit of small currents, the temperature of the overheated sensor immersed in the gas at low temperature can be lower than the temperature of the overheated sensor immersed in liquid at high temperature, especially below superfluid transition. The creeping superfluid film usually ensures that everything inside the cryostat is maintained at the same temperature as that of the liquid for a distance of several centimeters above its surface. An additional power up to tens of mW (depending on the device construction) is required to prevent the film creeping.

Another disadvantage of the statically overheated approach is the absence of a simple liquid vs. vapor criterion. It is easy to determine the level while moving the sensor from the top of the cryostat to the bottom (dip-stick type of measurements) until the R(h) (where h is the height of the stick) dependence will show a characteristic discontinuity.

This approach requires moving parts and sliding sealing. For the fixed positioned sensor (when the helium level passes through the fixed sensor location), in the limit of small currents, the temperature of the overheated sensor surrounded by the gas at low temperature might happened to be lower than the temperature of the overheated sensor immersed in liquid at high temperature. As a result, one has to increase current, but in this case due to the approaching to the Leidenfrost regime it becomes difficult to distinguish between sensor in liquid and sensor in gas states even for the single temperature.

One of the possible solutions is to burn the film with a separate heater. An elegant thermal device was suggested in Reference [5] and improved by Reference [6]. Basically it consists of a separate heater and a sensor. The sensor is connected to the heater via weak thermal link. The power of the heater is adjusted strong enough to burn out the superfluid film. The status of the device (in or out of the liquid) is determined as follows. A digital voltmeter is connected parallel to the sensor; the current through the sensor is set to a small value of 10 µA via a simplified current source. The heater is periodically switched on and off via connecting/disconnecting it to a variable power supply. In liquid, the thermal contact of the sensor to the surrounding helium is much stronger than to the heater. The sensor is strongly anchored to the helium bath. As a result the voltage at the sensor $U_{sensor}$ is practically insensitive to the status of the heater (on or off). In gas, the thermal contact of the sensor with the environment is reduced and the temperature of the sensor will follow the temperature of the heater. The output voltage will depend on the status of the heater (on or off) or fluctuate. Thus the fluctuating voltage can be used as a simple criterion of the sensor in gas state independent on the helium bath temperature (see Reference [6]).

The improved device (see Reference [6]) consists of pair of 51 Ohm 0.125 W Allen Bradley carbon resistors mounted on a 4 mm diameter stainless steel tube and fixed by GE7031 varnish. The length of the unit is less than 12 mm. The lower resistor is used as a heater while the upper serves as a temperature sensor. The burning of the super-thermal film requires some time and energy. If the device is placed just above the surface of superfluid helium, the heater voltage of 2.5 V was enough to observe the resistance jump down in $t_{burn}=2-3$ s from 3.8 kOhm to 850 Ohm. In other words, the time response of this particular thermal device is rather slow—the duration of measuring pulse should be at least 3 s, while the thermal time constant of the sensor itself is in ms range (see Reference [7]). The energy consumption during the measuring pulse was estimated as ~0.1 J or the average power load to the heater during the measuring is at least 33 mW (see Reference [6]).

An alternative to the statically overheated approach is to use standing along self-heated detector in a pulsed mode to simplify the sensor construction and to reduce the average power dissipation of radio resistor based level indicators (see Reference [8]). In this setup, authors analyze the voltage profile across the sensor which is characteristic for helium gas phase and liquid phase.

For the silicon diode based sensors this approach was proposed in Reference [9] to measure the level of liquid nitrogen in a cryogenic tank. A relatively large (e.g. 30 mA) current is pulsed (for several seconds) through a forward-biased silicon diode. The thermal transients of the sensor (its thermal responses to the switching on and to the switching off) are studied. The temperature of the sensor is probed by request via a separate procedure: the current for a short time (few microseconds) is switched to a smaller value where the voltage across the diode is a known function of temperature. Resulting temperature transients are recorded and analyzed by a special data acquisition/analysis system to extract times required to overheat and to cool down the diode. These time constants are compared with typical values (found in a separate set of "learning" measurements) and, based on this comparison, the status of the sensor (in liquid or in gas) is assigned.

A similar approach was proposed in Reference [10] to probe the fuel level in aircrafts. The method of sensing the presence of a fluid includes the steps of energizing a temperature-dependent resistance to produce alternate cycles of warming and cooling and monitoring the rate at which the sensor warms and/or cools. These rates are characteristic of a resistance affected or unaffected by the presence of a fluid.

As for disadvantages of the prior art realization of the pulsed mode detectors one can count rather sophisticated hardware and non-trivial computer based computation procedure:

Several (at least two) temperature (or resistance) measurements must be taken during warming up and/or cooling down circle/circles, based on these measurements, a computation procedure is involved to calculate characteristic warming up and/or cooling down rates, the conclusion on the detector status is made based on comparison of these computed values with predefined (in a separate experiment) table values. These table values might depend on the temperature of surrounding, that's why methods in References [9], [10] imply direct or indirect knowledge of the temperature of the fluid.

It is a principal object of the invention to provide a robust apparatus and alternative and effective method for sensing and detection the level of a liquid, in particular of cryogenic liquids.

Another object of the invention is to provide a helium level indicator capable to detect the position of the helium liquid/gas interface in temperature range 1.0 to 4.2 K; having a low power consumption (less than 10 mW); characterized by a short response (less than 250 ms); providing a level position resolution better than 1 mm; based on robust liquid vs. gas criterion valid in the whole temperature range; having a simple and reliable thermal device construction.

SUMMARY OF THE INVENTION

According to the invention, this object is achieved by combining the procedural features initially defined with the following new features:

Performing a temperature measurement with the detector at the end of a time interval $t_{off}$ after the end of at least one heating pulse;

the power and the duration of the heating pulse being determined in a preceding test experiment such that the following condition is fulfilled for at least one time interval $t_{off}$:

the difference between the temperature of the detector measured at the end of the time interval $t_{off}$ in gas and the temperature of the detector measured at the end of the time interval $t_{off}$ in liquid is bigger than $2\Delta(T_{env})$, where $\Delta(T_{env})$ is the temperature resolution of the detector at the given temperature of its environment;

whereto the power and/or the duration of the heating pulse is/are increased by steps until it is possible to find at least one value of the time interval $t_{off}$ to satisfy the previous condition, choosing a threshold temperature $T_{threshold}$, satisfying at least the following conditions:

if the detector is immersed in liquid then the threshold temperature $T_{threshold}$ is above the temperature of the detector measured at the end of the time interval $t_{off}$ plus the temperature resolution $\Delta(T_{env})$ of the detector at the temperature of its environment $T_{env}$, if the detector is immersed in gas, then the threshold temperature $T_{threshold}$ is below the temperature of the detector measured at the end of the time interval $t_{off}$ minus the temperature resolution $\Delta(T_{env})$ of the detector at the temperature of its environment $T_{env}$;

deducing a position of the gas/liquid interface of the liquefied gas in the cryogenic tank below the position of the detector if the temperature of the detector measured at the end of the time interval $t_{off}$ after the end of the heating pulse is above the threshold temperature $T_{threshold}$, and deducing a position of the gas/liquid interface of the liquefied gas in the cryogenic tank above the position of the detector if the temperature of the detector measured at the end of the time interval $t_{off}$ after the end of the heating pulse is below the threshold temperature T threshold According to one aspect, the present invention provides a system for determining the level of a liquid in a tank. The system according to the invention comprises at least one resistance thermometer, mentioned below also as a resistance temperature detector or as a temperature sensor, said thermometer being supported/mounted inside a tank via construction materials with low thermal conductivity, a pulsed generator with is capable to supply at least one voltage or current pulse to the said sensor and thus capable to overheat the sensor to a notable extend above the temperature of the surrounding fluid, mentioned also as the temperature of the environment and a controller to monitor resistance of the sensor as it cools thereby to determine whether or not the sensor is immersed in liquid.

Further, logical electronics or a controller are provided to determine the status of the said sensor (in liquid vs. in gas) depending on a single resistance based measurement made after decreasing the power of the heating pulse or during the cooling down of the initially overheated sensor toward the temperature of the environment.

As a variant, a sequence of the heating pulses constituting of at least two pulses may be applied to the sensor. Starting from the second pulse, the resistance related signal (voltage across or current through) measured at the beginning of the pulse is directly mapped to the temperature to which the sensor had managed to cool down in between the pulses or this signal can be used like a single temperature measurement mentioned in the previous paragraph. Starting from the second pulse, the heating pulse can be also considered as a temperature measuring pulse and in turns this "measuring pulse" can be considered as a heating pulse for the following pulse, if any.

The overheating during the heating pulse and the time after the heating pulse at which the temperature measurement is done $t_{off}$ (or the time interval between the pulses if a sequence of pulses is used) can be adjusted, and the conclusion on the status of the sensor is made on comparison of its temperature measured at $t_{off}$ after the heating pulse or on its minimum temperature (starting from the second pulse) with a fixed threshold table value found in the separate test or learning experiment.

According to a further aspect, the present invention provides a method for determining the phase of a fluid in which a sensor is immersed. The method comprises the steps of:
 installing the sensor in the tank;
 immersing a sensor in fluid;
 connecting the sensor to a pulse generator;
 overheating the sensor above the temperature of environment during at least one heating pulse;
 switching off or reducing the power of heating thus allowing the sensor to cool down towards the temperature of the environment;
 waiting a time interval after reducing the heating power (after the end of the heating pulse);
 performing a single temperature measurement;
 and determining a phase of fluid based on the threshold criterion: the detector is immersed in liquid if the measured temperature is below a threshold value; the detector is immersed in gas if the measured temperature is above a threshold value.

According to another aspect, the present invention provides a method for determining the optimal set of fixed parameters such as the amplitude and/or duration of the heating pulse, time interval between the heating pulse and the temperature measurement and the threshold temperature to determine the phase of the fluid in a temperature range.

A preferred variant of the inventive method is characterized in that the power and/or the duration of the heating pulse and/or the time interval $t_{off}$ and the threshold temperature $T_{threshold}$ required to deduce the position of the gas/liquid interface are adapted to the environment temperature $T_{env}$ of the detector for a range between a minimum and maximum environment temperature $T_{env}^{min}$, $T_{env}^{max}$ by varying the power and/or the duration of the heating pulse, and/or the time interval $t_{off}$ in a special test experiment until it is possible to define a single threshold temperature $T_{threshold}$ valid to distinguish between detector-in-liquid and detector-in-gas states in the whole environment temperature range This preferred variant can be further improved by a specific variation in that a. the power and/or the duration of the heating pulse are/is adjusted at the maximum environment temperature $T_{env}^{max}$ in liquid to values sufficient to overheat the detector at the end of the heating pulse to an easily detectable value, i.e. the temperature $T_{heated}^{liquid}$ of the overheated detector in liquid must satisfy the following condition: $T_{heated}^{liquid} \gg T_{env}^{max} + 2\Delta(T_{env}^{max})$, where $\Delta(T_{env}^{max})$ is the temperature resolution of the detector in the vicinity of the maximum environment temperature $T_{env}^{max}$;

b. the detector is immersed in liquid at the maximum environment temperature $T_{env}^{max}$, and an optimum time interval $t_{off}$ is found by varying $t_{off}$ starting from zero by small portions until the detector (which was previously overheated with a power and duration of the heating pulse according to step a) is cooled down to a temperature $T_{detector}^{in\ liquid}(t_{off}, T_{env}^{max})$ close to the maximum environment temperature $T_{env}^{max}$ plus the temperature resolution of the detector $\Delta(T_{env}^{max})$ in the vicinity of the maximum environment temperature $T_{env}^{max}$, i.e.: $T_{detector}^{in\ liquid}(t_{off}, T_{env}^{max}) \approx T_{env}^{max} + \Delta(T_{env}^{max})$;

c. the detector is immersed into the gas, the environment temperature $T_{env}$ is reduced stepwise to the minimum environment temperature $T_{env}^{min}$ and the condition $T_{detector}^{in\ gas}(t_{off}, T_{env}) - \Delta(T_{env}) > T_{detector}^{in\ liquid}(t_{off}, T_{env}^{max}) + \Delta(T_{env}^{max})$ is checked for each step of the environment temperature $T_{env}$, where $T_{detector}^{in\ gas}(t_{off}, T_{env})$ is the temperature of the previously overheated detector in gas at $T_{env}$ measured at the end of the time interval $t_{off}$ after the end of the heating pulse and $\Delta(T_{env})$ is the temperature resolution of the detector at $T_{env}$;

d. If condition c fails for at least one environment temperature step $T_{env}$ then the power and/or the duration of the heating pulse are/is increased, and the time interval $t_{off}$ is adjusted to fulfill condition b, and the step c is repeated until condition c is fulfilled for all environment temperatures $T_{env}$ between the minimum and maximum environment temperature $T_{env}^{min}$, $T_{env}^{max}$;

e. the threshold temperature $T_{threshold}$ is chosen in the range $T_{detector}^{in\ liquid}(t_{off}, T_{env}^{max}) + \Delta(T_{env}^{max}) < T_{threshold} < T_{detector}^{in\ gas}(t_{off}, T'_{env})$, where $T_{detector}^{in\ gas}(t_{off}, T'_{env})$ is the detector temperature measured in gas at an environment temperature $T'_{env}$ at the end of the time interval $t_{off}$ after the end of the heating pulse, and where $\Delta(T'_{env})$ is the temperature resolution of the detector at a temperature $T'_{env}$, and where $T'_{env}$ is the environment temperature for which the detector temperature measured in gas at the end of the time interval $t_{off}$ after the end of the heating pulse is the lowest for all environment temperatures $T_{env}$ between the minimum and maximum environment temperature $T_{env}^{min}$, $T_{env}^{max}$.

A further advantageous variant of the inventive method is characterized by determining the position of a gas/liquid interface of He4, including superfluid He4, in a cryogenic tank with a self-heated resistance temperature detector being mounted inside the cryogenic tank by a support made from a material with low thermal conductivity in comparison to the thermal conductivity of He4, including superfluid He4, the cross section of the support being reduced to suppress additional thermal contact to the environment by the superfluid film, whereby the power of the heating pulse and/or the duration of the heating pulse are/is additionally cross-checked to be high enough to cancel creeping effects caused by the superfluid film while the detector is just above the superfluid helium gas/liquid/interface.

In another preferred variant of the inventive method the detector is connected to a pulse generator capable to produce a sequence of at least two heating pulses with the time interval between the pulses equal to the time interval $t_{off}$, and starting from the second heating pulse, the temperature of the detector at the very beginning of the heating pulse is used as the temperature measurement performed at the end of the time interval $t_{off}$ after the end of the preceding heating pulse.

Within the range of the present invention lies also a device for performing the method discussed above, which is characterized in that the self-heated resistance temperature detector is electrically connected to the pulse generator through a limiting resistor thereby constructing a voltage divider having two outputs Preferred is a variation of this embodiment, which is characterized in that for a test experiment the outputs of the voltage divider are electrically connected to two input channels of an oscilloscope capable to produce a digital trigger output signal.

It can further be advantageous if the oscilloscope is replaced by a comparator or any other threshold-like logical unit.

Within the range of the present invention lie also various specific procedures for operating the device according to the present invention:

A first variant of such procedures is characterized in that in the case of a detector with negative temperature coefficient the voltage across the detector only is monitored.

An alternative variant is characterized in that in the case of a detector with positive temperature coefficient the detector is connected through limiting resistor to the pulse voltage generator and the voltage across the limiting resistor which is proportional to the currents through the detector or the signal difference between the two input channels is monitored.

Of further advantage is a variant of such procedures for operating the device according to the invention with a detector having negative temperature coefficient or for operating the device with a detector having positive temperature coefficient, which procedure is characterized in that the detector is first immersed in liquid, the time interval $t_{off}$ between the heating pulses is adjusted until the signal amplitude at the beginning of the heating pulse starts to decrease or the time interval $t_{off}$ is adjusted to be just long enough to cool back the initially overheated detector to the temperature of the surrounding liquid and that a trigger level of the oscilloscope is set to an intermediate threshold value $U_{threshold}$ smaller than the signal amplitude at the beginning of the heating pulse in liquid but higher than the amplitude of the signal at the beginning of the heating pulse in gas.

In a preferred variation of the above procedures, the trigger output signal of the oscilloscope is used to determine the status of the detector, whereby the detector is assigned to be in liquid if starting from the second heating pulse the signal is triggered, otherwise the detector is assigned to be in gas.

The invention will be more readily understood from the following detailed description and the accompanying drawings, which illustrate one exemplified embodiment of the invention to probe the level of liquid helium for both above and below temperature of superfluid transition.

The invention is shown in some details in the drawings. For a more complete understanding of the invention, reference is made to the following description and accompanying drawings, in which:

DESCRIPTION OF THE PREFERRED EMBODIMENT

The present invention operates on the principal that the dynamical behavior of initially overheated detector is different when it is in thermal contact with surrounding liquid or with gas.

Figure 1:
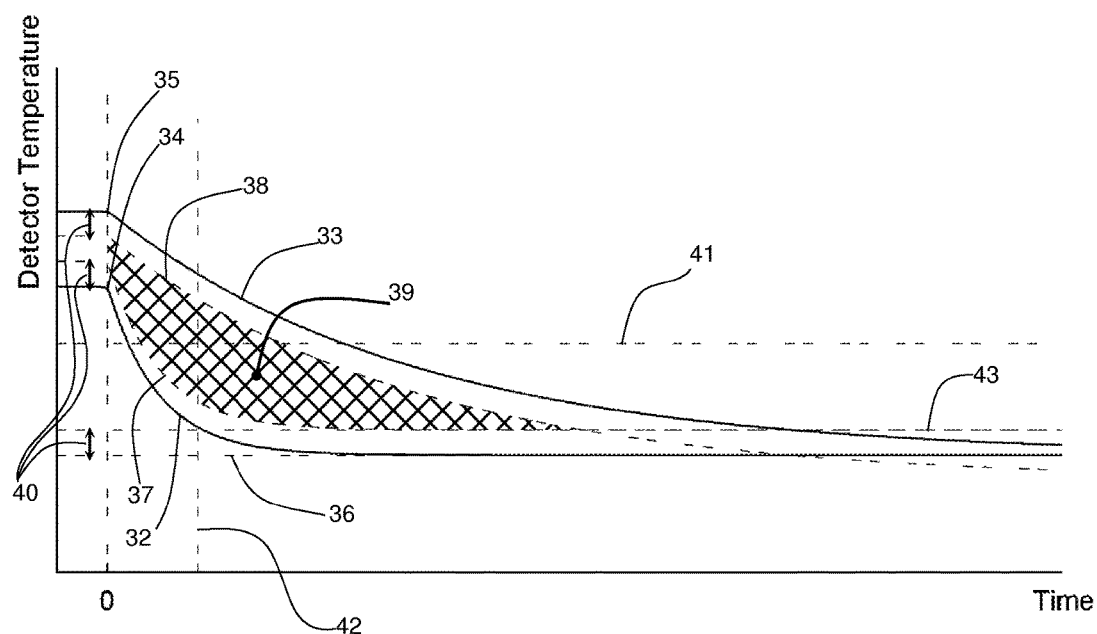
FIG. 1 represents schematically a cooling down dynamics of initially overheated detector.

The thermal behavior (detector temperature vs. time plots) is presented in FIG. 1 by solid lines: The line 32 schematically shows the thermal behavior of the sensor immersed in liquid, the line 33 schematically show the thermal behavior of the sensor immersed in gas respectively. At early times t<0 the sensor was overheated by Joule heating while it was connected to a current or a voltage source to the temperatures $T_{heated}^{liquid}$ 34 and $T_{heated}^{gas}$ 35 respectively.

In FIG. 1 the initial overheating is presented by horizontal lines just for simplicity. Present invention does not require a steady state overheating (when the temperature of the detector does not depend on time). Initial overheating can be achieved either by applying a short high power pulse or via a long term low Joule power pulse.

The thermal conductivity of the liquid is bigger than thermal conductivity of the gas. That is why one should expect that the overheating in gas $T_{heated}^{gas}$ 35 is bigger than overheating in liquid $T_{heated}^{liquid}$ 34 and in principal one can make conclusion on the status of the sensor by comparing the overheated temperatures as for example in References [3], [4].

The problem is that in the limit of high Joule heating, and in some cases it is necessary to apply big heat, for example to blow away the super-fluid film, the overheated sensor in liquid is surrounded by a low conductive vapor (Leidenfrost regime) and $T_{heated}^{liquid}$ tends to $T_{heated}^{gas}$.

At t=0 the heating is off and the sensor starts to cool down to the temperature of the environment 36. The rate at which the detector is cooled back to the temperature of the environment depends on the surrounding media: the thermal conductivity of the liquid is bigger than thermal conductivity of the gas and the cooling down is faster in liquid than in gas.

The conclusion on the status of the detector (in liquid vs. in gas) can be done from a single temperature measurement taken at $t_{off}$ after the end of the heating pulse $T_{detector}(t_{off})$ by comparison of this temperature with a threshold value $T_{threshold}$.

The filled region 39 in FIG. 1 represents all the pairs of $(t_{off}, T_{threshold})$ where this comparison is possible. This area is restricted by the curve 37 (which is obtained from the curve 32 by shifting it up by the temperature resolution of the detector at in the vicinity of the given environment temperature $\Delta(T_{env})$ 40), the curve 37 (which is obtained from the curve 33 by shifting it down by the temperature resolution of the detector $\Delta(T_{env})$ 40) and the line $t_{off}$=0.

In other words the filled region 39 in FIG. 1 represents all the pairs of ($t_{off}$, $T_{threshold}$) according to the following conditions:

$t_{off}$>0 and $$T_{detector}^{in\ liquid}(t_{off},T_{env})+\Delta(T_{env})<T_{threshold}<T_{detector}^{in\ gas}(t_{off},T_{env})-\Delta(T_{env}),$$

where $\Delta(T_{env})$ is a temperature resolution of the detector at the given environment temperature $T_{env}$. An addition of $\Delta(T_{env})$ into the liquid vs. gas criterion is introduced to eliminate false triggering.

In practice it is preferable to choose $t_{off}$ in the region where the temperature difference between the detector in gas and detector in liquid is close to its maximum and $T_{detector}^{in\ gas}(t_{off}, T_{env})-T_{detector}^{in\ liquid}(t_{off}, T_{env})>>2\Delta(T_{env})$ as denoted schematically by vertical line 42 in FIG. 1 and $T_{threshold}$ close to the middle value 0.5 ($T_{detector}^{in\ liquid}(t_{off})$+$T_{detector}^{in\ gas}(t_{off})$) as denoted schematically by horizontal line 41 in FIG. 1.

According to the present invention the principal of determining the status of the detector from a single temperature measurement can be extended to determine the status of the detector based on a single temperature measurement in a wide temperate range of the surrounding fluid starting from $T_{env}^{min}$ to $T_{env}^{max}$ with the fixed set of $t_{off}$, $T_{threshold}$ and the heating pulse parameters.

Figure 2:
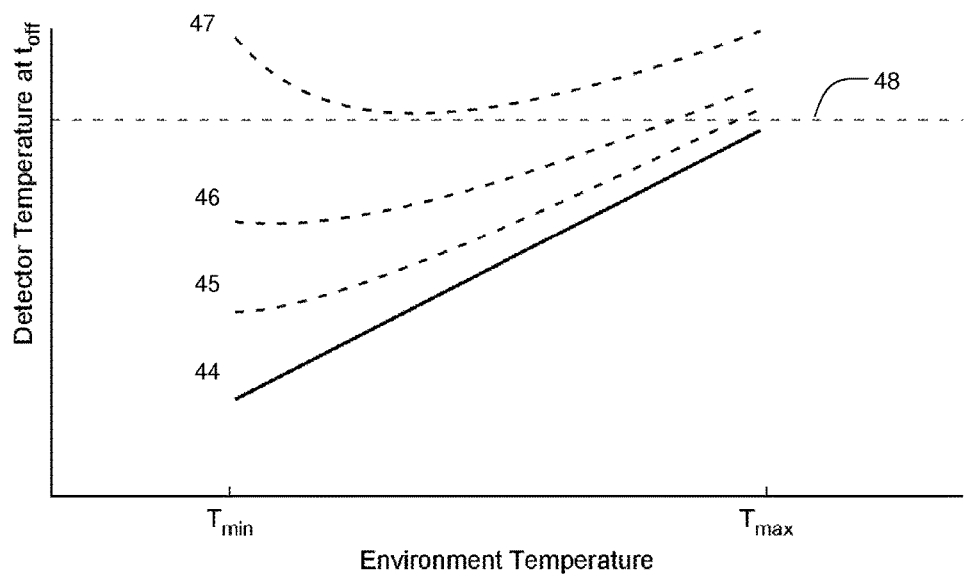
FIG. 2 represents a simplified procedure to find optimum parameters for a single temperature measurement.

The idea of such an extension is presented in FIG. 2. where the temperature of the detector measured at the end of the time interval $t_{off}$ after the end of the heating pulse is plotted for different temperature of the environments. Here the bold line 44 represents schematically a family of $T_{detector}^{in\ liquid}(t_{off})$ vs. temperature of the environment curves measured at different heating powers and/or duration of heating pulse in liquid, while dashed curves 45, 46, 47 represent family of $T_{detector}^{in\ gas}(t_{off})$ vs. temperature of the environment dependencies measured for different initial overheating in gas: initial overheating for curve 46 is bigger than for curve 45 and initial overheating for the curve 47 is in turn bigger than initial overheating for the curve 46.

The temperature resolution $\Delta(T_{env})$ is included in the thickness of the lines. Initial set of parameters is found at $T_{env}^{max}$ as described in the previous paragraph.

For the illustrative purposes it is convenient to choose $t_{off}$ in the region 42 where the $T_{detector}^{in\ liquid}(t, T_{env}^{max})$ 32 is touching the line $T_{env}^{max}+\Delta(T_{env}^{max})$ 43 or $t_{off}$ is chosen to be long enough to cool back the initially overheated detector in liquid close to the temperature of the environment. In this case $T_{detector}^{in\ liquid}(t_{off}, T_{env})\sim T_{env}$ and is slightly dependent on the initial overheating, that is why the curves measured at different initial overheating in liquid are schematically presented in FIG. 2 as an indistinguishable bold curve.

After initial step at $T_{env}^{max}$ a temperature scan towards the low temperature is performed and the condition $$T_{detector}^{in\ gas}(t_{off},T_{env})-\Delta(T_{env})>T_{detector}^{in\ liquid}(t_{off},T_{env})+\Delta(T_{env}) \quad (1)$$

is checked.

If this condition fails, the system is returned to the $T_{env}^{max}$, the heating power and/or duration of the heating pulse is increased until the overheating in liquid (the difference between $T_{heated}^{liquid}$ 34 and $T_{env}$ 32 is raised by a reasonable step of about 10% and the scan down to the low temperatures is repeated until the condition (1) is valid in the whole temperature range.

Geometrically the algorithm is equivalent to the following statement: the overheating is increased until it is possible to draw a horizontal line $T_{threshold}$ 48 which does not intersect with both $T_{detector}^{in\ liquid}(t_{off}, T_{env})$ and $T_{detector}^{in\ gas}(t_{off}, T_{env})$ (curves 47, 44 and line 48 in FIG. 2).

This threshold value can be used as a criterion to distinguish between detector in liquid and detector in gas in the whole temperature range: the detector is assign to be in liquid if the temperature of the detector measured at the end of the time interval $t_{off}$ after the end of the heating pulse is below the threshold value 48 otherwise detector is assigned to be in gas.

In particular the simplified algorithm described in the previous paragraph can be modified. For example in the case of big overheating an additional step of adjusting $t_{off}$ at $T_{env}^{max}$ may be required. One can consider FIG. 1 as a 2-dimensional cross section of a 3-dimensional presentation with the temperature of the environment as the third orthogonal coordinate. In such a presentation the area 39 is a cross section of a 3-dimensional object of allowed ($t_{off}$, $T_{threshold}$, $T_{env}$) points ("allowed" means where it is possible to distinguish between detector in gas vs. detector in liquid states from a single temperature measurements) at a given temperature of the environment, the shape of this 3-dimensional object depends on the overheating as a parameter.

In its Most General Form, the Present Invention can be Formulated as Follows:

The overheating is changed until it is possible to find at least one line ($t_{off}$, $T_{threshold}$, $T_{env}$) which does not leave the 3-dimensional object of the possible successful measurements while varying. $T_{env}$ from $T_{min}^{env}$ to $T_{env}^{max}$ or until $T_{detector}^{in\ gas}(t_{off}, T_{env})-\Delta(T_{env})>T_{threshold}>T_{detector}^{in\ liquid}(t_{off}, T_{env})+\Delta(T_{env})$ for all the $T_{env}^{min}<T_{env}<T_{env}^{max}$. On the other hand, once the overheating is fixed, one can choose any pair of ($t_{off}$, $T_{threshold}$) parameters similar to the filled area 39, but additionally restricted to be valid in the whole temperature range of interest, if this restricted area is not empty. By fixing overheating the present invention implies that the electrical and time parameters of the pulse generator used to overheat the detector are not varied with temperature, the real Joule heating may depend on the temperature of the environment.

Figure 3:
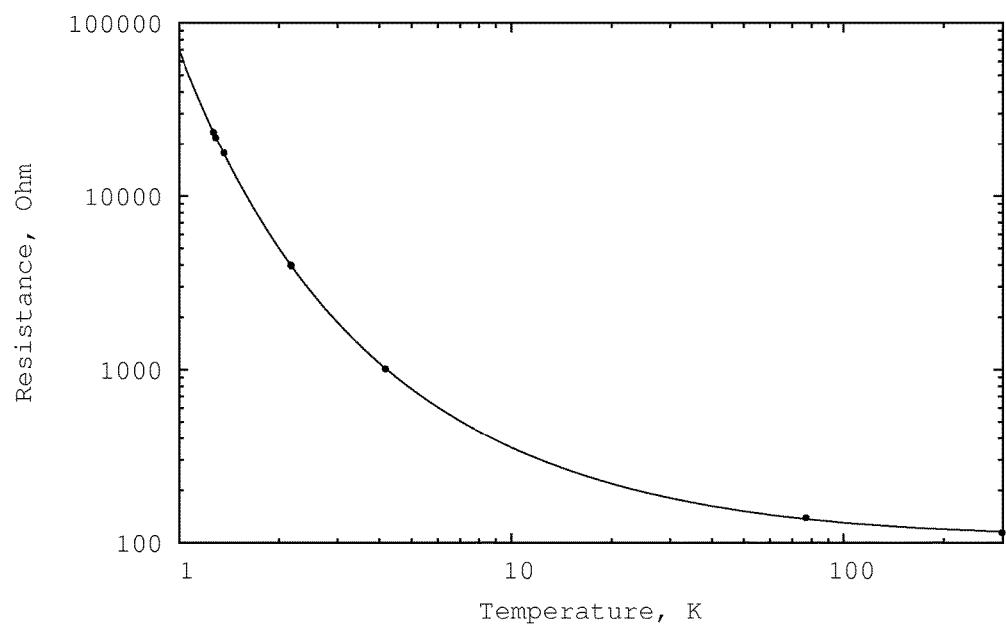
FIG. 3 represents a typical temperature calibration of a nominal 100 Ohm ⅛ W Allen Bradley resistor.

According to a particular realization, as a sensing/self-heated element, 100 Ohm 0.125 W Allen Bradley resistor is used. At the limit of small currents (where the sensor is not overheated) typical resistances are summarized in FIG. 3. The Allen-Bradley resistor was chosen because of the big sensitivity in the temperature range of interest (T<20 K). In principal one can use any resistance temperature detector (e.g. other carbon-glass resistors or $RuO_2$ based resistors).

Figure 4:
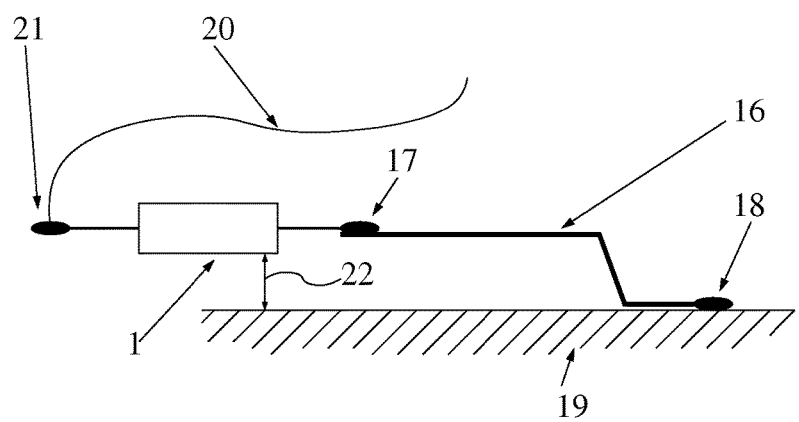
FIG. 4 is an example of the thermal device assembling.

To reduce the thermal mass, legs of the resistor 1 are cut to 4-5 mm (just enough for comfortable soldering). The sensor must be mounted on a thermally isolated way and at some distance 22 (at least 2 mm) from the surfaces 19. In the particular setup, one leg of the sensor was soft-soldered 17 to a wire with low thermal conductivity 16 (Isostan: diameter 0.35 mm, length ~10 mm). The wire is thin enough to limit the creeping effect. Another end of this wire can be soft-soldered 18 or fixed to the place of interest. Standard LakeShore phosphor bronze AWG 36 low temperature wire 20 is soft-soldered 21 to the second leg of the sensor (see FIG. 4).

Figure 5:
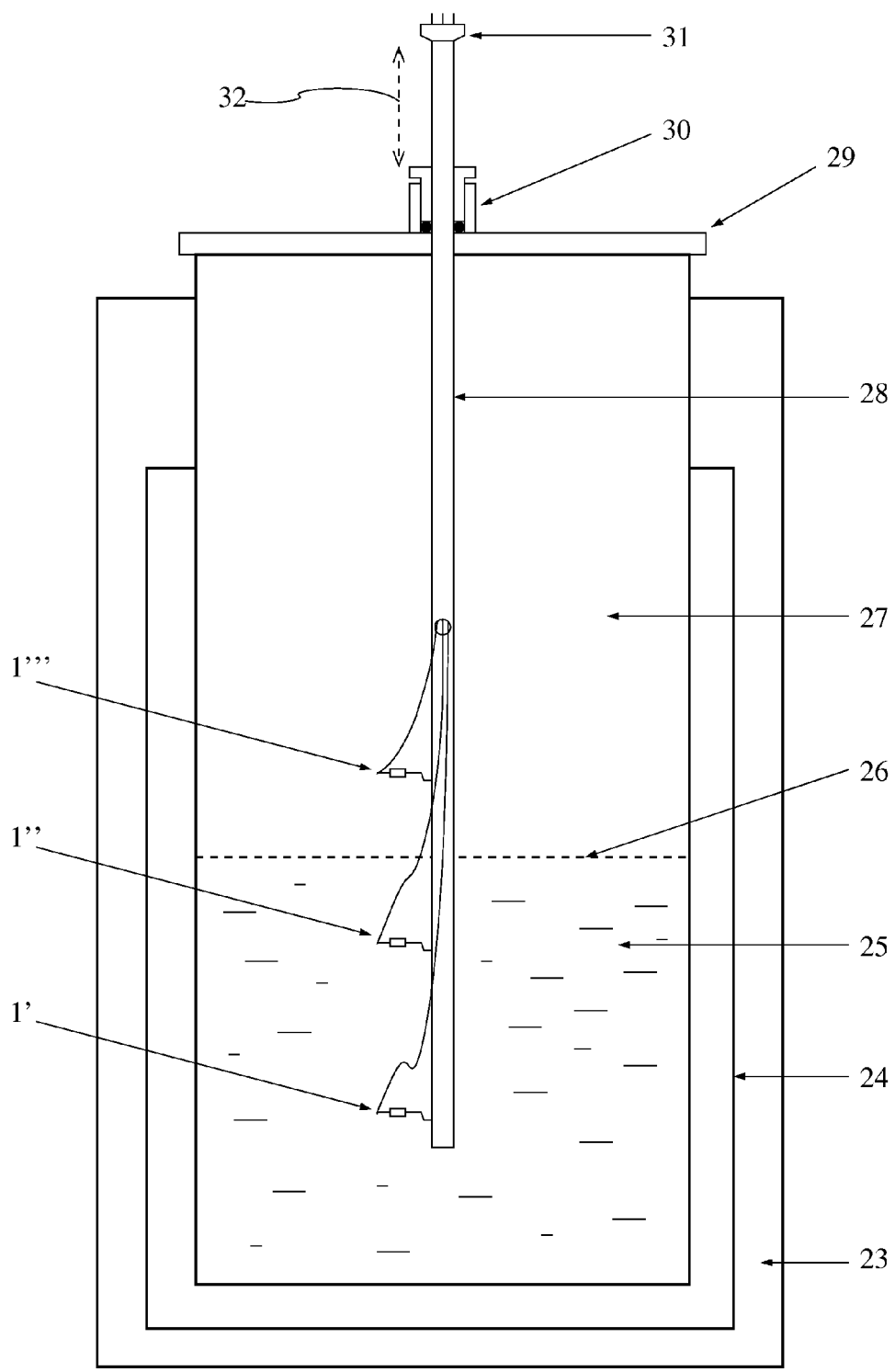
FIG. 5 shows several level sensors mounted inside a cryostat according to an example embodiment of the present invention.

FIG. 5 represents a possible realization of the level meter used for the test purposes (deep-stick setup). Several sensors 1, 1', 1" . . . are mounted inside a cryostat at the stainless steel tube 28 ended by a hermetical multi-pin connector 31. The cryostat is vacuum-insulated 23 and equipped with a thermal shield 24. The tube is hermetically sealed at the top flange 29 of the cryostat by O-ring based sliding sealing 30 and can be slide up and down or the height of the stick 32 can be varied and the sensors can be moved from the liquid helium 25 to the helium vapor 27 and vice versa crossing the liquid-vapor interface 26. The temperature of the liquid helium can be varied by pumping the helium gas via a vane pump or Roots pumping station (not shown).

Figure 6:
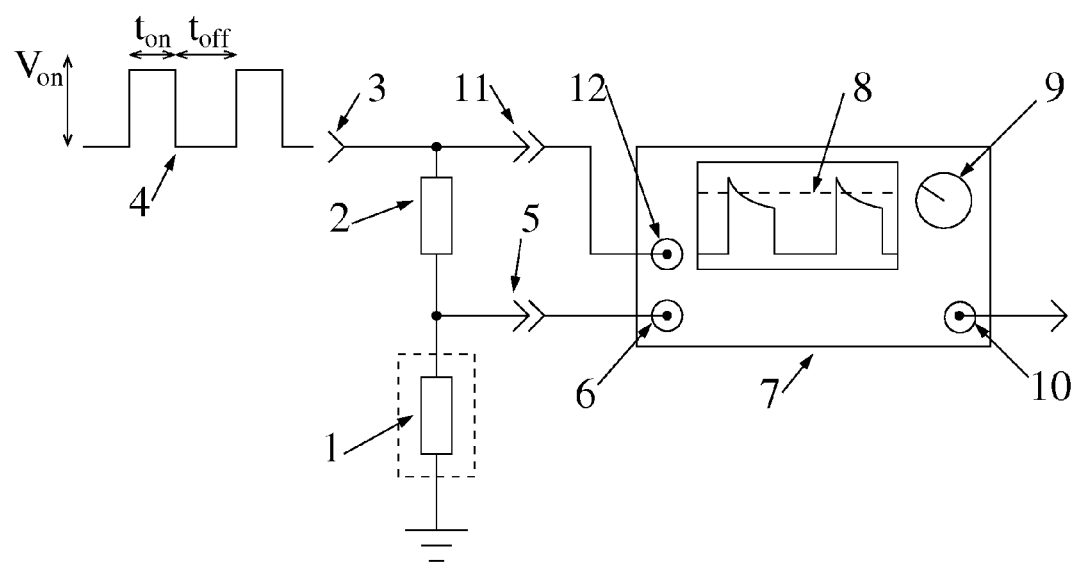
FIG. 6 represents an experimental setup used to illustrate the physical principle of the invention.

Electrical schematic of the particular test setup is shown in FIG. 6. The sensor 1 is connected through a limiting resistor 2 (located out of the cryostat at room temperature) to a pulse generator 3. Thus the sensor plus the limiting resistor constitute a voltage divider. The voltage at the sensor can be expressed as $$U_{sensor}(t) = \frac{R_{sensor}(t)}{R_{sensor}(t) + R_{limit}} \times U_{gen}(t), \quad (2)$$

where $R_{sensor}(t)$ is resistance of the sensor at time t and $R_{limit}$=100 Ohm. The generator produces rectangular periodical signal 4 $U_{gen}(t)=V_{on}$ during time interval $t_{on}$ and $U_{gen}(t)=0$ during next time interval $t_{off}$ and so on.

As the resistance of the detector is directly mapped to its temperature, the voltage across the detector or the current through the detector measured at the beginning of the pulse can be treated as a temperature measurement taken after time interval $t_{off}$ after the previous pulse which can be treated as a heating pulse.

If necessary, the generator can be used in a burst mode. In this case the very first pulse in the burst is unique as it does not have the previous counterpart. Starting from the second pulse the voltage amplitude across the detector or current amplitude can be treated as a temperature measurement taken at $t_{off}$ after the previous heating pulse.

Profiles of $U_{sensor}(t)$ were monitored by a standard digital oscilloscope 7.

The sensor is connected by a cable 5 to the CH1 input 6 of the oscilloscope. As a variant, output of the generator can be connected (by an additional cable 11) to the CH2 input 12 of the oscilloscope. The current through the sensor can also be recorded and monitored via substituting one channel from another and by dividing this differential voltage by $R_{limit}$. This setup is useful for the sensors with positive temperature coefficient as the current profile features for the sensor with positive temperature coefficient are similar to the voltage profiles measured across the sensor with negative temperature coefficient.

In the following description we will be focused on the sensor with negative temperature coefficient.

The amplitude $V_{on}$ of the heating pulse should be strong enough to overheat the sensor to at least several K or of about 10 mW. Moreover, in the case of superfluid helium, the heating should be strong enough to evaporate the superfluid film. The case of superfluid helium will be discussed later.

Figure 7:
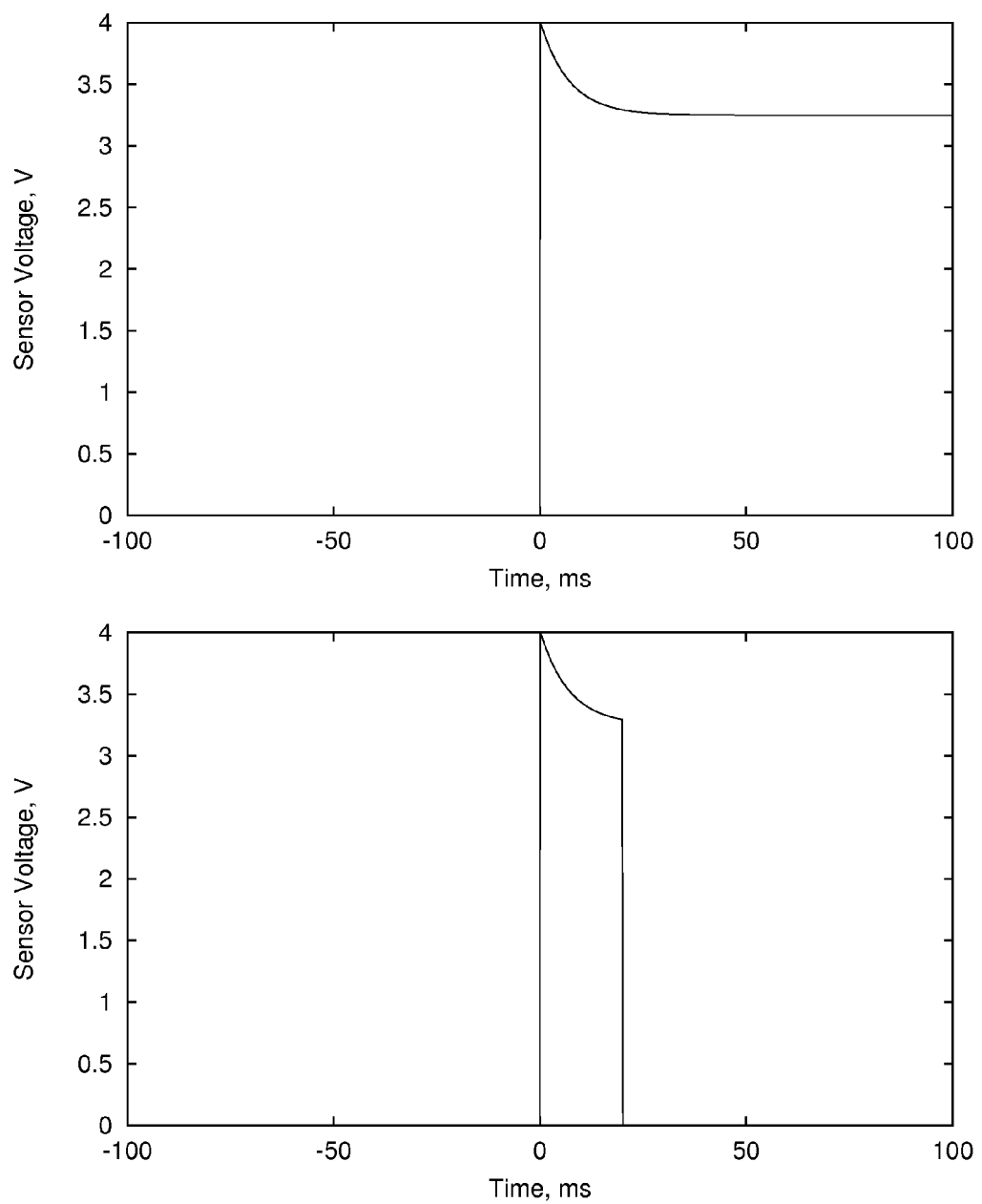
FIG. 7 represents the overheating of the sensor and the heating pulse length adjustment made in liquid helium, in particular the voltage profiles across the sensor recorded in normal liquid helium and a long heating pulse (upper part), whereas the length of the heating pulse is reduced to 20 ms (lower part)

The overheating process is illustrated in the upper part of FIG. 7. The sensor is immersed in normal liquid helium at 4.2 K. At t=0 a long pulse with $V_{on}$=5 V ($t_{on}$=1 s, $t_{off}$=10 s) is applied to the divider. At the very beginning of the pulse the sensor is cold, the resistance of the sensor is high and the voltage across the sensor is high (of about 4 V in our case). After a short time the sensor becomes overheated, the resistance of the sensor drops down and the voltage across the sensor tends to a reduced value (of about 3.25 V in our case). In our particular case, the length of the heating pulse can be reduced $t_{on}$=20 ms (see lower part of FIG. 7) without losing information on the sensor state. At the end of the 20 ms pulse the voltage at the sensor is close to the long-time limit.

The thermal behavior of the sensor changes dramatically while varying the "waiting" or cooling time $t_{off}$. During this time the overheated sensor is cooled via the environment. If $t_{off}$ is long enough to cool down the sensor to the temperature of the environment, the voltage at the beginning of the heating pulse $U_{sensor}(+0)$ is at maximum and does not depend on $t_{on}$. In this decoupled regime heating pulses are independent and $U_{sensor}(+0)$ is a function of the environment temperature only.

Figure 8:
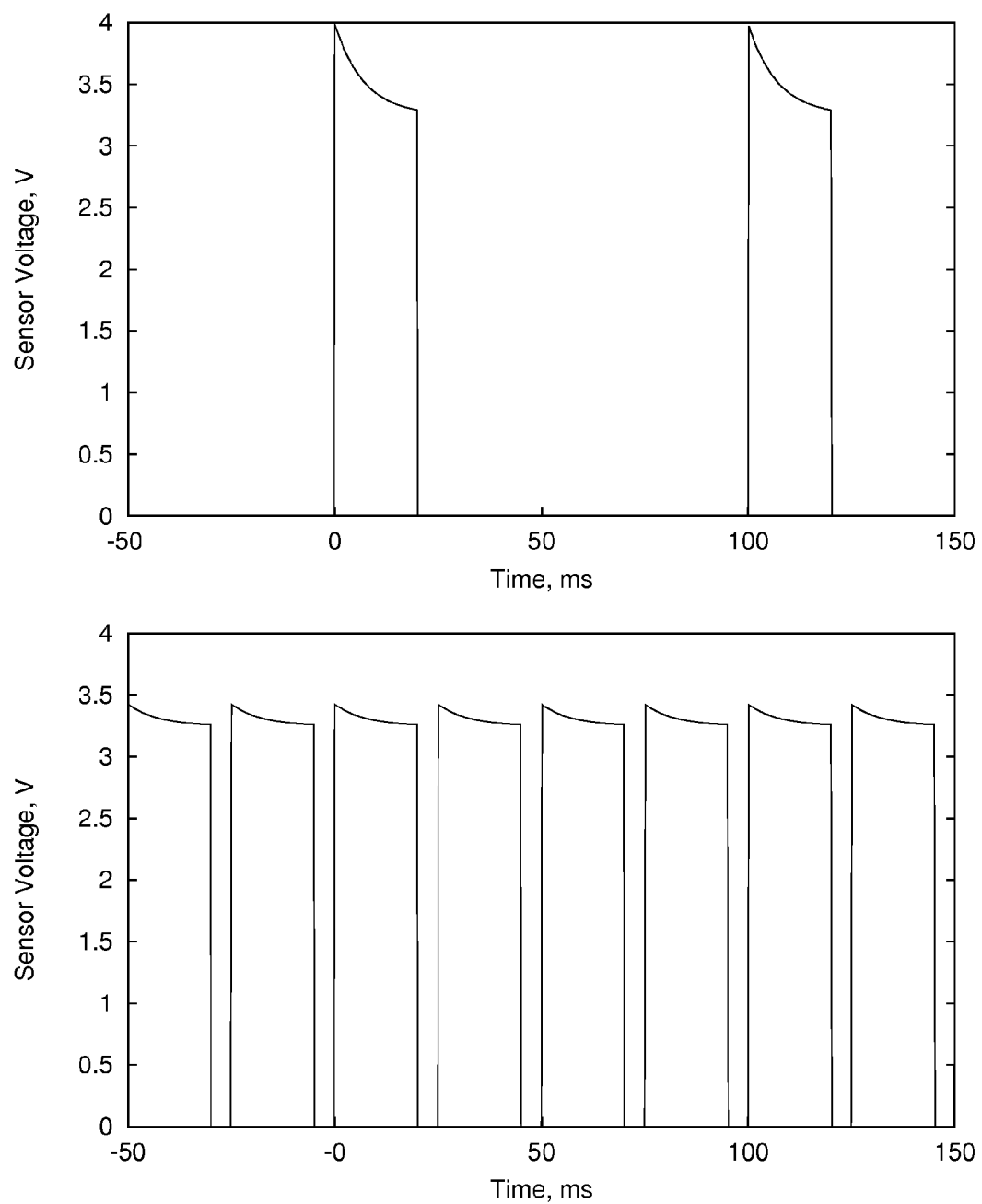
FIG. 8 represents the cooling pulse length adjustment, in particular the voltage profiles across the sensor recorded in normal liquid helium with the cooling time being long enough and the pulses are independent (upper part) and the length of cooling pulse being shortened and the sensor being always overheated (lower part)

For example, in the case of liquid helium, the voltage profiles across the sensor measured after $t_{off}$=10 ms (see lower part of FIG. 7) and after $t_{off}$=80 ms (see upper part of FIG. 8) are practically identical. The picture changes dramatically if $t_{off}$ is not enough to cool the sensor.

At some values of $t_{off}$ the device changes its behavior from "decoupled" to a kind of "dynamical". In the dynamic state the sensor is never at the temperature equilibrium with the environment.

At the beginning of the heating pulse the sensor "remembers" that it was hearted during the previous pulse. The amplitude at the beginning of the heating pulse is reduced and tends to its value at the end of the heating pulse: $U_{sensor}(+0) \rightarrow U_{sensor}(t_{on})$ In the case of liquid helium, $t_{off}$=5 ms is short and the amplitude at the beginning of the heating pulse is changed from 4.0 V to 3.4 V (see lower part of FIG. 8). At $t_{off} \rightarrow 0$ the behavior of the system changes to a pure static (continuous heating).

By varying the length of the waiting pulse $t_{off}$ one can tune the dynamical feature of the device.

Here down we formulate the main principal of our device. The cooling back of the initially overheated sensor is more efficient and fast if the sensor is immersed in liquid than if the sensor is surrounded by a helium gas. It means that once $t_{off}$ was tuned to be just enough to cool back the sensor in liquid, this particular $t_{off}$ is not long enough to cool the sensor in gas.

Figure 9:
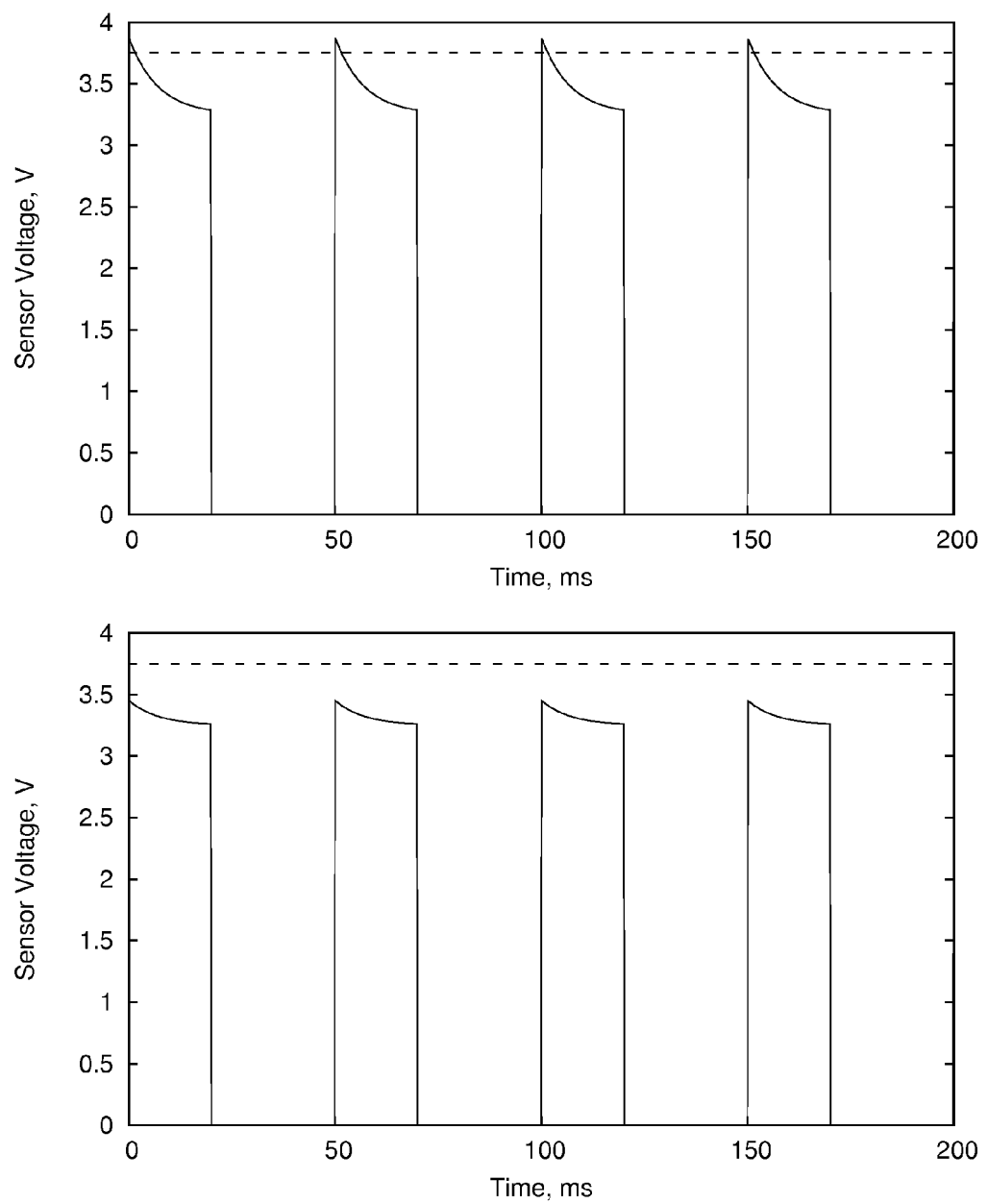
FIG. 9 illustrates threshold-like criterion to distinguish between liquid and gas helium, in particular voltage profiles across the sensor recorded in liquid phases (upper part) and in gas phases (lower part)

The algorithm to find optimum $t_{off}$ is illustrated in FIG. 9. First the sensor was immersed in liquid helium at 4.2 K and the cooling time was tuned starting from long times down to $t_{off}$=30 ms until the amplitude $U_{sensor}(+0)$ was slightly changed from its decoupled limit (see upper part of FIG. 9). This time is at the limit to cool down the sensor in liquid but is not enough to cool the overheated sensor in gas at 4.2 K (see lower part of FIG. 9): The maximum voltage across the sensor in gas is sufficiently lower than the maximum voltage across the sensor in liquid.

The thermal device is in decoupled state in liquid and in dynamical state in gas.

The temperature scans down to 1.1 K had revealed similar behavior.

Figure 10:
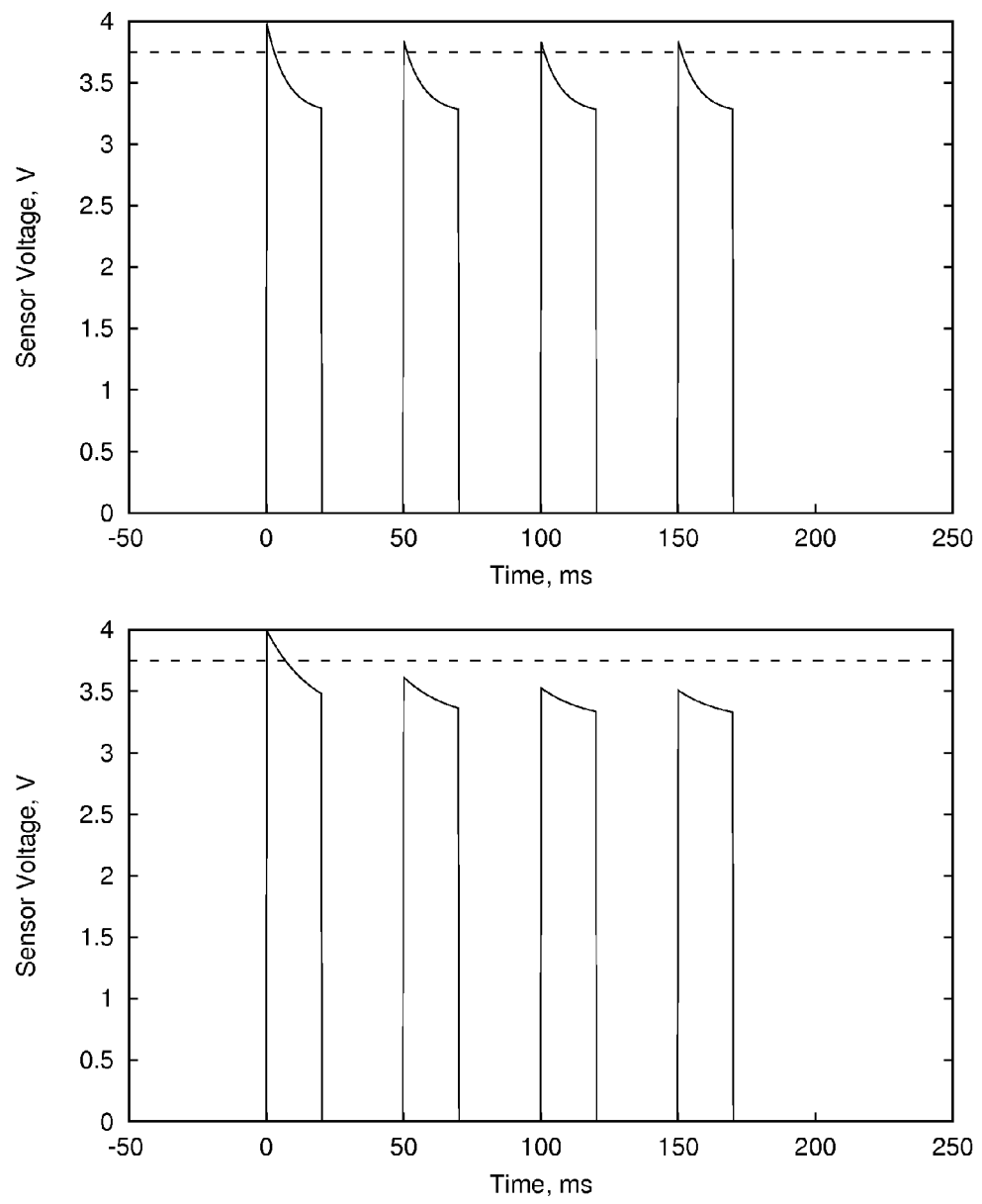
FIG. 10 illustrates an improved burst mode of the level meter, in particular voltage profiles across the sensor recorded in liquid phases (upper part) and in gas phases (lower part) in the "burst" mode.

This allowed us to formulate a threshold-like criterion to distinguish between the liquid and the gas. The sensor is assigned to be in liquid if the voltage at the divider is bigger than (or crosses through) some critical threshold value $U_{threshold}$ Otherwise the sensor is assign to be in gas. For the particular realization of the device one can chose $U_{threshold}$=3.75 V (dashed line in FIG. 9, FIG. 10 and "8" in FIG. 6).

In the separate test experiment it was cross-checked that the same set of the parameters: $V_{on}$=5 V, $t_{on}$=20 ms, $t_{off}$=30 ms, and threshold value $U_{threshold}$=3.75 V found at 4.2 K can be used down to lowest temperatures.

The threshold value $U_{threshold}$=3.75 V found at 4.2 K can be used down to lowest temperatures. This can be understood from the following qualitative arguments. Let us consider the sensor in liquid at T<4.2 K. As the heating power is chosen relatively high, during the heating pulse the sensor is surrounded by the vapor (Leidenfrost regime) and final temperature of the sensor (~20 K in our case) is practically independent of the temperature of the liquid. After the heating is off the sensor is cooled back and, as the heat capacity of the sensor decreases with lowering the temperature, the cooling back time to low temperatures is similar to cooling time to 4.2 K. As for the sensor in gas at low temperatures, the power during the heating pulse must be strong enough to remove the super-fluid film effects. Otherwise, as the low temperatures are characterized by low vapor pressure, the sensor is even better insulated from the environment in the low pressure gas than at 4.2 K. This will result to the higher temperature of the overheated sensor and to the longer time of the cooling back process. As a result for the sensor immersed in liquid $U_{sensor}^{liquid}(+0)$ at T<4.2 K is bigger than $U_{sensor}^{liquid}(+0)$ at 4.2 K and for the sensor in gas $U_{sensor}^{gas}(+0)$ at T<4.2 K is smaller than $U_{sensor}^{gas}(+0)$ at 4.2 K and one can use a single fixed criterion $U_{threshold}$=3.75 V to distinguish between sensor-in-liquid and sensor-in-gas state in the whole temperature range T≤4.2 K.

For the particular realization of the level indicator, the generator output voltage $V_{on}$=5 V is enough to cancel the superfluid film based effects at T≤2.17 K. In general one has to plot $U_{sensor}(+0)$ as a function of the deep stick height h 32 via sliding the stick up and down. The plot $U_{sensor}(+0, h)$ must show a step-like behavior. The position of the step $h_0$ should not depend neither on the direction of the stick movement (up or down) nor on the small (say 10% change of $V_{on}$). If it is not the case, one has to increase the generator output $V_{on}$ by small steps until the hysteresis disappears and repeat the calibration procedure in normal helium at 4.2 K.

To reduce the power load the device can be used in measurements-by-request or burst mode: The burst mode in liquid is illustrated in the upper part of FIG. 10. The burst mode in gas is illustrated in the lower part of FIG. 10. Both in liquid and in gas, at the beginning of the very first heating pulse (or at the beginning of the burst) the sensor is cold and the voltages across the sensor are similar. That is why the very first pulse must be excluded from the analysis. At the beginning of the second heating pulse the sensor is cold if it is in contact with liquid, or it is overheated if the sensor is in contact with gas. One can use similar the continuous mode criterion: the sensor is considered to be in gas if, starting from the second heating pulse, the voltage across the sensor is below the critical value $U_{threshold}$ found for the continuous mode (dashed line in the lower part of FIG. 10, 3.75 V for the particular setup).

The present invention comprises a ready to use device. Most of the modern oscilloscopes support digital trigger output that can deliver the trigger signal to another instrument. After adjusting the oscilloscope trigger threshold to $U_{threshold}$ one can use this output to drive any external device (e.g. a level alarm).

As for the detectors with positive temperature coefficient the variant of the device where the current signal through the sensor is monitored by the oscilloscope can be used.

According to the present invention, functional or pulse generator and oscilloscope can be used at the stage of finding the optimum operation parameters only. In the practical realization one can use any custom generator and any voltage or current reading device and any logical unit (comparator), and any software. In measurements by request mode one can use a comparator with latch enable function—the latch should be disabled starting from the end of the first heating pulse.

According to a further aspect, dip-stick setup of the sensor is preferred at the stage of finding the optimum operation parameters only. In a practical installation it is convenient to mount several sensors at different specific heights inside the cryogenic tank (cryostat) to give immediate and permanent readings of the level. In other installations one probe may be used to determine the minimum level below which the level must not fall and another probe may be mounted at the position of the maximum level to control a filling procedure.

The invention is naturally not limited to the above described example as illustrated in the drawings and may be modified in various ways familiar to those versed in the art, depending upon the required applications, without thereby departing from the scope of the invention.

A method and apparatus to for indicating the level of a liquefied gas such as helium (including superfluid helium), hydrogen, nitrogen or oxygen in a cryogenic tank having a probe and a controller are presented. The probe is a resistance temperature detector such as carbon composite resistor, $RuO_2$ based resistor, germanium resistance thermometer or any other resistance thermometer. The controller applies a heating pulse to the detector and performs a single resistance measurement after the heating pulse. The overheating of the sensor and the time interval for the measurement are found in a separate set of test experiments. As a result, for the temperature sensors with negative temperature coefficient, the resistance of the sensor in gas is below some unique characteristic value, which can be used like a threshold criterion to distinguish between the liquid and the gas in a wide temperature range. For the sensors with positive temperature coefficient, the resistance of the sensor in gas is bigger than some unique characteristic value, which can be used like a threshold criterion to distinguish between the liquid and the gas in a wide temperature range.

As a variant the controller may apply a pulsed sequence to the detector. The pulse sequence consists of periodical bursts of the voltage-on and voltage-off states. During voltage-on state the detector is overheated well above the environment. During voltage-off state the detector is cooled towards the temperature of the environment. At the stage of the device adjustment, the sensor is immersed into the liquid and the duration of the voltage-off state is adjusted and fixed to be just enough to cool the sensor or the sensor is "cold" at the beginning of the following heating pulse. As the liquid level falls below the position of the detector, the thermal contact of the detector to the environment decreases and the duration of the said voltage-off state appears to be not enough to cool the detector to the environment or the detector remains overheated during all the following pulses.

REFERENCES

[1] Celik D, Hilton D K, Zhang T, Van Sciver S W. Helium II level measurement techniques. Cryogenics 2001; 41:355.
[2] Strait S F, Bertman B. Thermal boundary resistance differences between carbon resistors in contact with helium liquid and vapour. Cryogenics 1969; 9:328.
[3] Crisp R S, Runes J. A simple liquid helium depth gauge using carbon resistors as sensing elements. Journal of Scientific Instruments (Journal of Physics E) 1969 Series 2; 2:541.

[4] Bapna S C, Pravinkumar M, Thirumaleshwar M. An inexpensive liquid helium level sensing unit. Cryogenics 1983; 23:278.

[5] McClintock P V E. Liquid level detector for a pumped bath of He II. Cryogenics 1978; 18:183.

[6] Yoshiki H. Simple thermo-level meter for He I and He II by a dynamic method. Cryogenics 1984; 24:704.

[7] Linensberg D, Spellicy E, Radebaugh R. Thermal response times of some cryogenic thermometers. In: Temperature: Its measurement and control in science and industry, ed. J. F. Schooley (American Institute of Physics, New York, 1982) Vol. 5, Part 2, pp 1367-1372.

[8] Ardenkjaar-Larsen J H, Fridlund B, Gram A, Hansson G, Hansson L, Lerche M H, Servin R, Thaning M, Golmanb K. Increase in signal-to-noise ratio of >10,000 times in liquid-state NMR. Proc. Natl. Acad. Sci. U.S.A. 2003; 100(18):10158.

[9] Yeckley A, Method and apparatus for detecting the level of a liquid. U.S. Pat. No. 7,392,691 B1 2008.

[10] Davis A, Fluid-level sensing and fluid detection. US Patent Application Publication US 2006/0042375 A1 2006.

We claim:

1. A method of operation of a device for determining a position of a gas/liquid interface of a liquefied gas, helium, superfluid helium, neon, hydrogen, nitrogen or oxygen in a cryogenic tank, the device having at least one self-heated resistance temperature detector mounted inside the cryogenic tank with a support made from a material with low thermal conductivity in comparison to a thermal conductivity of surrounding media, the detector being connected to a current or voltage pulse generator, the device further having means to read out a temperature of the detector in dependence on an electric resistance of that detector, the method comprising the steps of:

a) applying at least one current or voltage heating pulse from the pulse generator to the detector, a power and duration of that heating pulse being sufficient for overheating the detector at an end of the heating pulse to a temperature $T_{heated}$ above a temperature of a detector environment $T_{env}$ plus a temperature resolution $\Delta(T_{env})$ of the detector at the temperature of the detector environment, wherein $T_{heated} > T_{env} + \Delta(T_{env})$;

b) performing a temperature measurement with the detector at an end of a time interval $t_{off}$ after the end of at least one heating pulse, wherein a power and a duration of the heating pulse is determined in a preceding test experiment such that, for at least one time interval $t_{off}$, a condition is fulfilled, the condition specifying that a difference between a temperature of the detector measured at an end of the time interval $t_{off}$ in gas and a temperature of the detector measured at the end of the time interval $t_{off}$ in liquid is greater than $2\Delta(T_{env})$, where $\Delta(T_{env})$ is the temperature resolution of the detector at the temperature of the detector environment, a power and/or a duration of the heating pulse thereby being increased by steps until at least one value of the time interval $t_{off}$ is found which satisfies the condition;

c) choosing a threshold temperature $T_{threshold}$, such that, if the detector is immersed in liquid, then the threshold temperature $T_{threshold}$ is above a temperature of the detector measured at the end of the time interval $t_{off}$ plus the temperature resolution $\Delta(T_{env})$ of the detector at the temperature of the detector environment $T_{env}$ and, if the detector is immersed in gas, then the threshold temperature $T_{threshold}$ is below the temperature of the detector measured at the end of the time interval $t_{off}$ minus the temperature resolution $\Delta(T_{env})$ of the detector at the temperature of the detector environment $T_{env}$;

d) deducing a position of a gas/liquid interface of the liquefied gas in the cryogenic tank below a position of the detector if the temperature of the detector measured at the end of the time interval $t_{off}$ after the end of the heating pulse is above the threshold temperature $T_{threshold}$; and e) deducing a position of the gas/liquid interface of the liquefied gas in the cryogenic tank above the position of the detector if the temperature of the detector measured at the end of the time interval $t_{off}$ after the end of the heating pulse is below the threshold temperature $T_{threshold}$.

2. The method of claim 1, wherein the power and/or the duration of the heating pulse and/or the time interval $t_{off}$ and the threshold temperature $T_{threshold}$ required to deduce the position of the gas/liquid interface are adapted to the detector environment temperature $T_{env}$ for a range between a minimum and maximum environment temperature $T_{env}^{min}$, $T_{env}^{max}$ by varying the power and/or the duration of the heating pulse and/or the time interval $t_{off}$ in a special test experiment until a single threshold temperature $T_{threshold}$ is defined which is valid to distinguish between detector-in-liquid and detector-in-gas states through an entire environment temperature range.

3. The method of claim 2, further comprising the steps of:

f) adjusting the power and/or the duration of the heating pulse at the maximum environment temperature $T_{env}^{max}$ in liquid to values sufficient to overheat the detector at the end of the heating pulse to a value at which the temperature $T_{heated}^{liquid}$ of the overheated detector in liquid must satisfy the following condition: $T_{heated}^{liquid} \gg T_{env}^{max} + 2\Delta(T_{env}^{max})$, where $\Delta(T_{env}^{max})$ is the temperature resolution of the detector in a vicinity of the maximum environment temperature $T_{env}^{max}$;

g) immersing the detector in liquid at the maximum environment temperature $T_{env}^{max}$ and determining an optimum time interval $t_{off}$ by varying $t_{off}$ starting from zero by small portions until the detector, which was previously overheated with a power and duration of the heating pulse according to step f), is cooled down to a temperature $T_{detector}^{in\ liquid}(t_{off}, T_{env}^{max})$ close to the maximum environment temperature $T_{env}^{max}$ plus the temperature resolution of the detector $\Delta(T_{env}^{max})$ in the vicinity of the maximum environment temperature $T_{env}^{max}$, such that a g condition $T_{detector}^{in\ liquid}(t_{off}, T_{env}^{max}) \approx T_{env}^{max} + \Delta(T_{env}^{max})$ is satisfied;

h) immersing the detector into the gas and reducing the environment temperature $T_{env}$ stepwise to the minimum environment temperature $T_{env}^{min}$, wherein an h condition $T_{detector}^{in\ gas}(t_{off}, T_{env}) - \Delta(T_{env}) > T_{detector}^{in\ liquid}(t_{off}, T_{env}^{max}) + \Delta(T_{env}^{max})$ is checked for each step of the environment temperature $T_{env}$, where $T_{detector}^{in\ gas}(t_{off}, T_{env})$ is a temperature of a previously overheated detector in gas at an environmental temperature step $T_{env}$ measured at an end of the time interval $t_{off}$ after the end of the heating pulse and $\Delta(T_{env})$ is the temperature resolution of the detector at temperature $T_{env}$;

i) if the h condition fails for at least one environment temperature step $T_{env}$, increasing the power and/or the duration of the heating Pulse and adjusting the time interval $t_{off}$ to fulfill the g condition and repeating step h) until the h condition is fulfilled for all environment temperatures $T_{env}$ between the minimum and maximum environment temperature $T_{env}^{min}$, $T_{env}^{max}$; and j) choosing the threshold temperature $T_{threshold}$ in a range $T_{detector}^{in\ liquid}(t_{off}, T_{env}^{max}) + \Delta(T_{env}^{max}) < T_{threshold} < T_{detector}^{in\ gas}(t_{off}, T_{env}^{*}) - \Delta(T_{env}^{*})$, where $T_{detector}^{in\ gas}(t_{off}, T_{env}^{*})$ is the detector temperature measured in gas at an environment temperature $T_{env}^{*}$ at the end of the time interval $t_{off}$ after the end of the heating pulse, and $\Delta(T_{env}^{*})$ is the temperature resolution of the detector at a temperature $T_{env}^{*}$, wherein $T_{env}^{*}$ is an environment temperature for which the detector temperature measured in gas at the end of the time interval $t_{off}$ after the end of the heating pulse is lowest for all environment temperatures $T_{env}$ between the minimum and maximum environment temperature $T_{env}^{min}$, $T_{env}^{max}$.

4. The method of claim 1, wherein a position of a gas/liquid interface of He4 or of superfluid He4 is determined in a cryogenic tank with a self-heated resistance temperature detector being mounted inside the cryogenic tank with a support made from a material having low thermal conductivity in comparison to a thermal conductivity of He4 or of superfluid He4, a cross section of the support being reduced to suppress additional thermal contact to an environment by superfluid film, wherein the power of the heating pulse and/or the duration of the heating pulse are/is additionally cross-checked to be high enough to cancel creeping effects caused by the superfluid film while the detector is just above the superfluid helium gas/liquid/interface.

5. The method of claim 1, wherein the detector is connected to a pulse generator capable of producing a sequence of at least two heating pulses, wherein a time interval between the pulses is equal to the time interval $t_{off}$, and, starting from a second heating pulse, a temperature of the detector at a very beginning of the heating pulse is used as the temperature measurement performed at the end of the time interval $t_{off}$ after the end of the preceding heating pulse.

6. The method of claim 1, wherein a self-heated resistance temperature detector is electrically connected to the pulse generator through a limiting resistor thereby constructing a voltage divider having two outputs, wherein outputs of the voltage divider are electrically connected to two input channels of an oscilloscope capable to produce a digital trigger output signal.

7. The method of claim 6, wherein the detector has a negative temperature coefficient and a voltage across the detector or a signal of an input channel only is monitored.

8. The method of claim 6, wherein the detector has a positive temperature coefficient and a voltage across the limiting resistor which is proportional to currents through the detector or a signal difference between the two input channels is monitored.

9. The method of claim 6, wherein the detector is first immersed in liquid and a time interval $t_{off}$ between the heating pulses is adjusted until a signal amplitude at a beginning of the heating pulse starts to decrease or the time interval $t_{off}$ is adjusted to be just long enough to cool back an initially overheated detector to a temperature of surrounding liquid and a trigger level of the oscilloscope is set to an intermediate threshold value $U_{threshold}$ smaller than the signal amplitude at the beginning of the heating pulse in liquid but higher than an amplitude of the signal at the beginning of the heating pulse in gas.

10. The method of claim 6, wherein the trigger output signal of the oscilloscope is used to determine a status of the detector, wherein the detector is assigned to be in liquid if, starting from a second heating pulse, the signal is triggered and otherwise the detector is assigned to be in gas.

11. The method of claim 1, wherein a self-heated resistance temperature detector is electrically connected to the pulse generator through a limiting resistor, thereby constructing a voltage divider having two outputs and the outputs of the voltage divider are electrically connected to two input channels of a comparator capable of producing a digital trigger output signal.

\* \* \* \* \*